United States Patent [19]

Yamazaki

[11] Patent Number: 4,844,879

[45] Date of Patent: Jul. 4, 1989

[54] PROCESS FOR PREPARING RHODIUM NITRATE SOLUTION

[75] Inventor: Hiroshi Yamazaki, Urayasu, Japan

[73] Assignee: Tanaka Kikinzoku Kogyo K.K., Japan

[21] Appl. No.: 216,125

[22] Filed: Jul. 7, 1988

[30] Foreign Application Priority Data

Jan. 12, 1988 [JP] Japan .................................. 62-4252

[51] Int. Cl.$^4$ ...................... C01F 11/14; C01G 55/00
[52] U.S. Cl. ................................ 423/395; 423/544; 423/592
[58] Field of Search ....................... 423/395, 544, 592

[56] References Cited

U.S. PATENT DOCUMENTS

| | | | |
|---|---|---|---|
| 1,135,785 | 4/1915 | Frasch | 423/592 |
| 3,425,801 | 2/1969 | Stowe | 423/544 |

FOREIGN PATENT DOCUMENTS 744776  10/1966  Canada ................................ 423/592

*Primary Examiner*—John Doll
*Assistant Examiner*—Wayne A. Langel
*Attorney, Agent, or Firm*—Klauber & Jackson

[57] ABSTRACT

A process of the present invention comprises dissolving rhodium black in sulfuric acid under heating, making the pH of the said sulfuric acid solution neutral or basic by adding an alkaline solution to the said sulfuric acid solution to precipitate rhodium as rhodium hydroxide, separating the rhodium hydroxide and dissolving it in nitric acid.

The process is useful for preparing the rhodium nitrate solution which is not decomposed by heating or concentration to produce turbidity, and produces almost no changes when it is allowed to stand at room temperature for a long period of time. Since the rhodium nitrate solution has the excellent heat-stability and endurance for long term storage, the said solution can be employed as a useful rhodium source which does not decompose for a variety of applications.

3 Claims, No Drawings

PROCESS FOR PREPARING RHODIUM NITRATE SOLUTION

BACKGROUND OF INVENTION

This invention relates to a process for preparing a rhodium nitrate solution employed for producing a catalyst having the excellent stability and the like.

Conventionally, in order to prepare a rhodium nitrate solution, a caustic soda aqueous solution, aqueous ammonia or the like is added to a rhodium chloride solution to form rhodium hydroxide therein, and the resulting precipitate is dissolved in nitric acid to prepare rhodium nitrate.

However, the rhodium nitrate solution prepared according to the above process produces a colloidal precipitate to make itself turbid when the solution is heated. The solution also produces a similar colloidal precipitate even at room temperature when it is allowed to stand for one week or more. Although the reason the precipitate is formed is not necessarily apparent, the following ones are considered to be acceptable. That is, (i) part of the rhodium nitrate is converted into rhodium hydroxide through hydrolysis; (ii) since the rhodium hydroxide is not completely converted into the rhodium nitrate by simply dissolving the rhodium hydroxide in the nitric acid, the rhodium hydroxide which easily precipitates remains in the solution so that the hydroxide deposits with the elapse of time; and (iii) the conversion of the rhodium chloride to the rhodium hydroxide is insufficient so that the rhodium hydroxide contains impurities which promote the deposition of the rhodium nitrate. The said decomposition and the like lower such a characteristic of rhodium as catalyst efficiency.

Heating or concentration of a rhodium nitrate solution may be necessary depending on a purpose of use, and further the longer term storage may be required. The conventionally prepared rhodium nitrate solution can not keep its characteristic in such conditions.

SUMMARY OF INVENTION

It is an object of the present invention to provide a process for preparing a rhodium nitrate solution which is stable and produces substantially no precipitates upon heating or concentration.

It is another object of the invention to provide a process for preparing a rhodium nitrate solution which produces substantially no precipitates when it is allowed to stand at room temperature for a long period of time.

The present invention is a process for preparing a rhodium nitrate solution which comprises dissolving rhodium black in sulfuric acid under heating, making the pH of the said sulfuric acid solution neutral or basic by adding an alkaline solution to the said sulfuric acid solution to precipitate rhodium as rhodium hydroxide, separating the rhodium hydroxide and dissolving it in nitric acid.

DETAILED DESCRIPTION

The starting material for preparing a rhodium nitrate solution according to the present invention is rhodium black. Commercially available rhodium black may be employed as the starting rhodium black, or the rhodium black may be prepared from other rhodium sources. The rhodium black can be made by adding a reductant to a rhodium chloride solution, an example of one of the other rhodium sources. Although the rhodium black prepared from such a rhodium source may be used in the procedures of the invention after separation and drying, the wet rhodium black is preferably employed as it is without separation procedure for reducing the number of steps.

Then the rhodium black is dissolved in sulfuric acid which is preferably concentrated sulfuric acid of 98% in such a heat stable vessel as a crucible made of quartz. The amount of the rhodium black employed is preferably the one which is dissolved in the sulfuric acid to lead it to saturation.

Then the sulfuric acid solution in which the rhodium black has been dissolved is strongly heated at a relatively high temperature, for example, at 260° to 330° C. for 0.2 to 2.0 hours, preferably for 0.5 to 1.0 hour, to convert the rhodium black into rhodium sulfate. In this conversion, it is expected that the sulfuric acid which is strongly heated completely converts the rhodium black into the rhodium sulfate by its strong oxidative effect as fuming sulfuric acid can do. Even if, in this stage, part of an insoluble substance such as unreacted rhodium black remains, it may be harmless.

After this conversion, it is preferable to remove the precipitates such as the unreacted rhodium black and impurities by filtering the heat-treated solution. However, the filtration can be omitted if these precipitates do not exist.

Subsequently, the rhodium is made to be precipitated as rhodium hydroxide by adding an alkaline solution to the above rhodium sulfate solution so that the sulfuric acid is neutralized and further the solution is made neutral or basic. The alkaline solution employed may not be especially limited. It is sufficient to employ an ordinarily used solution such as an caustic soda aqueous solution and aqueous ammonia. The amount of the alkaline solution to be added is preferably the minimum amount which is sufficient to precipitate the rhodium hydroxide almost completely, and the absolute amount changes with the amount of the dissolved rhodium. The alkaline solution may be added until the pH of the solution is made to be 7 to 9.

The precipitated rhodium hydroxide is then separated from the solution by an appropriate means such as filtration, and if necessary the rhodium hydroxide is washed with pure water so that the above alkaline solution and the impurities are removed.

Nitric acid is then added to the separated rhodium hydroxide to dissolve the hydroxide to form a rhodium nitrate solution.

The rhodium nitrate solution prepared according to the present invention produces substantially no turbidity by producing the precipitates upon heating up to 110° C., and similarly produces no turbidity when it is allowed to stand at room temperature for about 15 weeks.

Although the accurate reason the rhodium nitrate solution prepared according to the invention produces no precipitates upon heating or standing of a long period of time remains uncertain, it may be conjectured that, when the process of this invention is compared with the conventional process, the rhodium hydroxide prepared through the series of steps which comprises the step of adding the rhodium black to the sulfuric acid under heating and the step of converting the resulting rhodium sulfate into the rhodium hydroxide with the alkaline solution, in each step of which the reaction sufficiently proceeds, contains substantially no impurities so that the final product, the rhodium nitrate solution, contains substantially no substances which are likely to precipitate.

The process of the invention, in preparation of the rhodium nitrate solution from the rhodium black, comprises dissolving the rhodium black in the concentrated sulfuric acid under heating, making the pH of the said sulfuric acid solution neutral or basic by adding the alkaline solution to the said sulfuric acid solution to precipitate rhodium as rhodium hydroxide, separating the rhodium hydroxide and dissolving it in nitric acid. The thus prepared rhodium nitrate solution is not decomposed upon heating or concentration to produce turbidity, and produces almost no changes when it is allowed to stand at room temperature for a long period of time. Since the rhodium nitrate solution has the excellent heat-stability and endurance for long term storage, the said solution can be employed as a useful rhodium source which does not decompose for a variety of applications.

The present invention will now be described in detail in connection with the following Example and the Comparative Example which are intended to be illustrative of the invention but not limitative.

EXAMPLE

About 250 g of wet rhodium black which had been prepared by reducing a rhodium chloride solution by means of a caustic soda aqueous solution and hydrazine was put into a crucible made of quartz, and was dissolved in 300 ml of concentrated sulfuric acid (guaranteed reagent, 98%) and was strongly heated for one and half hours. Subsequently, the solution was filtered, and aqueous ammonia (guaranteed reagent, 28%) was added to the solution until the pH thereof became 8 to 9 to produce a yellow precipitate. After the solution was filtered, the resultant precipitate was washed with pure water. The precipitate was dissolved in 150 ml of 62% nitric acid to obtain 3.5 mol/l of a rhodium nitrate solution. The yield was about 70%.

When the rhodium nitrate solution was heated to 110° C. for 60 minutes, no turbidity was produced. When the temperature was further raised to 120° C. and the solution was heated for 120 minutes, slight turbidity was observed.

When the rhodium nitrate solution was allowed to stand at room temperature for 15 weeks, no turbidity was observed, and slight turbidity was observed after 25 weeks.

COMPARATIVE EXAMPLE

After rhodium hydroxide was precipitated by adding a caustic soda aqueous solution to a rhodium chloride solution, the precipitate was separated by filtration. To 100 g of this wet rhodium hydroxide was added 40 ml of 62% nitric acid to form a rhodium nitrate solution. When the solution was heated to 105° C., brown turbidity was formed. Further when the solution was allowed to stand at room temperature of 20° to 25° C. for two weeks, the formation of black-brownish turbidity was observed.

What is claimed is:

1. A process for preparing a rhodium nitrate solution which comprises dissolving rhodium black in sulfuric acid under heating, making the pH of the said sulfuric acid solution neutral or basic by adding an alkaline solution to the said sulfuric acid solution to precipitate rhodium as rhodium hydroxide, separating the rhodium hydroxide and dissolving it in nitric acid.

2. The process as claimed in claim 1, wherein the heating of the sulfuric acid solution is carried out at 260° to 330° C. for 0.2 to 2.0 hours.

3. The process as claimed in claim 1, wherein the alkaline solution is a caustic soda aqueous solution and/or aqueous ammonia.

* * * * *